United States Patent
Whalen et al.

(10) Patent No.: US 10,507,906 B2
(45) Date of Patent: Dec. 17, 2019

(54) AERODYNAMIC SURFACE ASSEMBLY DEFINING A FLUIDIC ACTUATION ORIFICE

(71) Applicant: The Boeing Company, Chicago, IL (US)

(72) Inventors: Edward A. Whalen, Webster Groves, MO (US); Michael DeSalvo, Smyrna, GA (US); Ari Glezer, Atlanta, GA (US)

(73) Assignee: THE BOEING COMPANY, Chicago, IL (US)

( * ) Notice: Subject to any disclaimer, the term of this patent is extended or adjusted under 35 U.S.C. 154(b) by 584 days.

(21) Appl. No.: 14/697,930

(22) Filed: Apr. 28, 2015

(65) Prior Publication Data

US 2016/0318602 A1    Nov. 3, 2016

(51) Int. Cl.
| | | |
|---|---|---|
| *B64C 21/04* | (2006.01) | |
| *B64C 3/14* | (2006.01) | |
| *B64C 9/14* | (2006.01) | |

(52) U.S. Cl.
CPC ............... *B64C 21/04* (2013.01); *B64C 3/14* (2013.01); *B64C 9/14* (2013.01); *Y02T 50/166* (2013.01)

(58) Field of Classification Search
CPC .... B64C 3/14; B64C 9/14; B64C 9/16; B64C 9/38; B64C 21/025; B64C 21/04; B64C 21/06; B64C 2009/005; B64C 2230/04

(Continued)

(56) References Cited

U.S. PATENT DOCUMENTS

| | | | | |
|---|---|---|---|---|
| 3,355,125 A | * | 11/1967 | Allcock | .................. B64C 21/04 244/207 |
| 4,137,008 A | * | 1/1979 | Grant | ..................... B64C 3/141 244/207 |

(Continued)

FOREIGN PATENT DOCUMENTS

| | | |
|---|---|---|
| FR | 61 015 E | 3/1955 |
| FR | 1 258 619 A1 | 4/1961 |

(Continued)

OTHER PUBLICATIONS

Extended European Search Report from corresponding European Patent Application No. 16167467.6 dated Aug. 29, 2016.

(Continued)

*Primary Examiner* — Tien Q Dinh
*Assistant Examiner* — Brady W Frazier
(74) *Attorney, Agent, or Firm* — Alston & Bird LLP

(57) ABSTRACT

An aerodynamic surface assembly is provided to facilitate control of the flow over the aerodynamic surface. The aerodynamic surface assembly includes an aerodynamic surface defining an outer mold line over which a fluid is to flow in a downstream direction. The outer mold line defines a smooth contour that is interrupted by step down region that is inset relative to the smooth contour defined by the outer mold line upstream thereof. The aerodynamic surface defines an orifice opening in to the step down region. The aerodynamic surface assembly may also include an overhang extending from the outer mold line of the aerodynamic surface upstream at the orifice. The overhang extends in the downstream direction and at least partially over the orifice. The aerodynamic surface assembly may also include a fluidic actuator defining a pair of curved passageways extending from an input region and are in fluid communication with the orifice.

17 Claims, 3 Drawing Sheets

(58) Field of Classification Search
USPC .................................................. 244/207
See application file for complete search history.

(56) References Cited

U.S. PATENT DOCUMENTS

| | | | | |
|---|---|---|---|---|
| 4,391,424 | A * | 7/1983 | Bartoe, Jr. ............... | B64C 9/32 244/110 B |
| 4,674,716 | A * | 6/1987 | Moore ..................... | B64C 3/50 244/207 |
| 4,749,151 | A * | 6/1988 | Ball ........................ | B64C 21/025 137/15.1 |
| 4,848,701 | A * | 7/1989 | Belloso ................... | B64C 9/146 244/12.5 |
| 4,955,565 | A * | 9/1990 | Coplin ..................... | B64C 23/06 244/130 |
| 6,142,425 | A * | 11/2000 | Armanios ................. | B64C 9/38 239/562 |
| 6,253,782 | B1 | 7/2001 | Raghu | |
| 6,425,553 | B1 * | 7/2002 | Smith ...................... | B64C 21/04 244/130 |
| 8,382,043 | B1 * | 2/2013 | Raghu ..................... | B64C 21/04 244/1 N |
| 2010/0181433 | A1 * | 7/2010 | Catino ..................... | B64C 21/025 244/208 |
| 2013/0277502 | A1 * | 10/2013 | Bauer ...................... | B64C 21/08 244/208 |
| 2013/0284273 | A1 * | 10/2013 | Boespflug ............... | B64C 21/04 137/13 |
| 2013/0291981 | A1 * | 11/2013 | Lengers ................... | B64C 21/04 137/825 |
| 2016/0375986 | A1 * | 12/2016 | Shmilovich ............. | B64C 21/04 244/207 |

FOREIGN PATENT DOCUMENTS

| | | |
|---|---|---|
| SU | 1782220 A3 | 12/1992 |
| WO | WO 2014/114988 A1 | 7/2014 |

OTHER PUBLICATIONS

Ahuja, K. K. et al., *Control of Flow Separation by Sound*, AIAA 84-2298, (Oct. 1984) 1-14.
Amitay M, et al., *Controlled transients of flow reattachment over stalled airfoils*, International Journal of Heat and Fluid Flow, vol. 23, No. 5 (2002) 690-699.
Carrannanto, P. et al., *Navier-Stokes analysis of life-enhancing tabs on multi-element airfoils*, Aircraft Design, (Sep. 1998).
Cerretelli, C. et al., *Unsteady Separation Control for Wind Turbine Applications at Full Scale Reynolds Numbers*, AIAA 2009-380, (Jan. 2009) 1-13.
Crowther, W., *Separation Control on a Trailing-Edge Flap Using Air Jet Vortex Generators*, Journal of Aircraft, vol. 43, No. 5 (Sep. 2006) 1589-1593.
DeSalvo, M. et al., *Enhancement of a High-Lift Airfoil Using Low-Power Fluidic Actuators*, AIAA 2010-4248, 5th Flow Control Conference, (2010) 1-15.
DeSalvo, M. et al., *High-Lift Enhancement using Fluidic Actuation*, AIAA 2010-863, 48th AIAA Aerospace Sciences Meeting Including the New Horizons Forum and Aerospace Exposition, (Jan. 2010) 1-17.
Glezer, A. et al., *Aspects of Low and High-Frequency Actuation for Aerodynamic Flow Control*, AIAA Journal, vol. 43, No. 7 (Jul. 2005) 1501-1511.
Gomes, L. et al., *Towards a Practical Synthetic Jet Actuator for Industrial Scale Flow Control Applications*, IUTAM Symposium on Flow Control and MEMS: Proceedings of the IUTAM Symposium Held at the Royal Geographical Society, (Sep. 2006) 8 pages.
Greenblatt, D. et al., *Dynamic Stall Control by Periodic Excitation, Part 2: Mechanisms*, Journal of Aircraft, vol. 38, No. 3 (May 2001) 439-447.
Gregory, J. et al., *Characterization of the Microfluidic Oscillator*, AIAA Journal, vol. 45, No. 3 (Mar. 2007) 568-576.
Honohan, A. M. et al., *Aerodynamic Control using Synthetic Jets*, A1AA-2000-2401, (Jun. 2000) 1-18.
McLean, J.D. et al., *Study of the Application of Separation Control by Unsteady Excitation to Civil Transport Aircraft*, NASA/CR-1999-209338, (Jun. 1999) 1-59.
Nagib, H, et al., *Control Techniques for Flows with Large Separated Regions: A New Look at Scaling Parameters*, AIAA 2006-2857 (Jun. 2006) 1-18.
Raman, G. et al., *Cavity Resonance Suppression Using Miniature Fluidic Oscillators*, AIAA Journal, vol. 42, No. 12, (Dec. 2004) 2608-2612.
Schatz, M. et al., *Separation Control by Periodic Excitation and its Applicationto a High-Lift Configuration*, AIAA 2004-2507, (Jun. 2004) 1-10.
Seifert, A. et al., *Delay of Airfoil Stall by Periodic Excitation*, Journal of Aircraft, vol. 33, No. 4 (Jul. 1996) 691-698.
Shmilovich, A. et al., *Flow Control for the Systematic Buildup of High Lift Systems*, AIAA 2006-2855, (Jun. 2006) 1-14.
Smith, B. L. et al., *The Formation and evolution of synthetic jets*, Physics of Fluids, vol. 10, No. 9, (Sep. 1998) 2281-2297.
Smith, D. M. et al., *The ADVINT Program*, AIAA 2006-2854, (Jun. 2006) 1-13.
Viets, H., *Flip-Flop Jet Nozzle*, AIAA Journal, vol. 13, No. 10, (Oct. 1975) 1375-1379.
Wu, J.-Z. et al., *Post-stall flow control on an airfoil by local unsteady forcing*, Journal of Fluid Mechanics, vol. 371 (1998) 21-58.
Office Action issued for European application 16167467.6 dated Feb. 26, 2018, 5 pages.
Office Action for Russian Application No. 2016105307/11(008591) dated Aug. 26, 2019.

\* cited by examiner

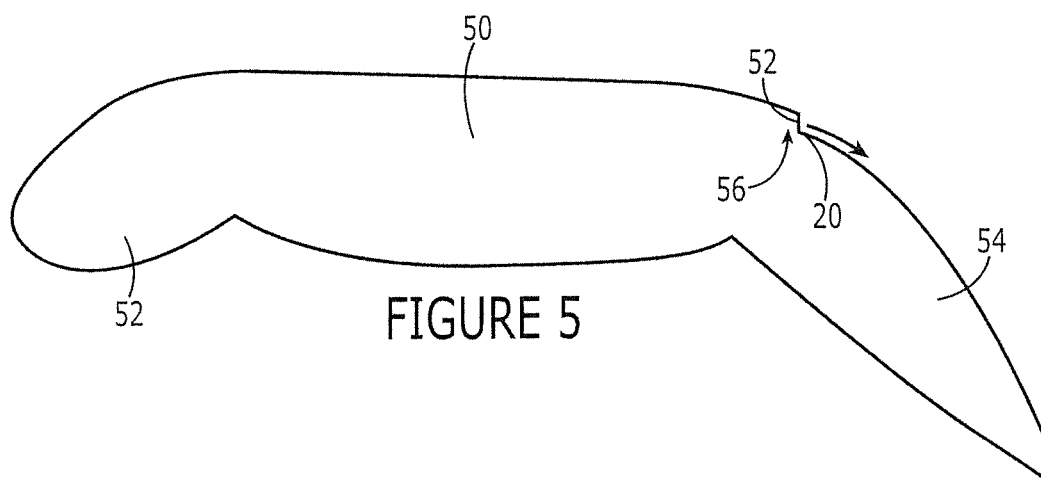

AERODYNAMIC SURFACE ASSEMBLY DEFINING A FLUIDIC ACTUATION ORIFICE

TECHNOLOGICAL FIELD

An example embodiment of the present invention relates generally to an aerodynamic surface assembly and, more particularly, to an aerodynamic surface assembly that defines one or more fluidic actuation orifices to facilitate active flow control of the flow field proximate the aerodynamic surface.

BACKGROUND

Aerodynamic surfaces are employed in a variety of applications, such as flaps and other control surfaces of an aircraft. In use, fluid flows over the aerodynamic surface so as to establish a flow field. In some instances, the flow field that passes proximate the aerodynamic surface may be controllably altered in order to modify the performance provided by the aerodynamic surface. For example, an aerodynamic surface may employ active flow control in order to inject fluid or momentum into the flow field passing proximate the aerodynamic surface. Some traditional forms of active flow control include steady blowing or suction of a fluid, pulsed blowing or suction of a fluid and synthetic jets. Active flow control has also been provided by fluidic oscillators that generate self-oscillating jets so as to provide spatial and temporal oscillation. As a result of the active flow control, the flow field is controllably altered which correspondingly modifies the resulting performance provided by the aerodynamic surface as well as the performance of the vehicle or other structure that embodies the aerodynamic surface. In this regard, the injection of fluid or momentum into a flow field may mitigate the partial or complete flow separation of the flow field from the aerodynamic surface, thereby facilitating performance improvements.

Active flow control on lifting surfaces has primarily focused on the mitigation of partial or complete flow separation over stalled flaps or wing sections in an instance in which the separating shear layers are dominated by a strong coupling to the instability of the wake that leads to the nominally time-periodic formation and shedding of large-scale vortices. Thus, the manipulation and control of separation on an aerodynamic surface have typically been based on the narrow-band receptivity of the separating, wake-dominated flow to external actuation at a frequency corresponding to the instability of the near wake. This actuation induces a Coanda-like deflection of the shed vortices toward the surface of the stalled airfoil. An alternative approach to reducing flow separation which is decoupled from the global flow (wake) instabilities is a modification of the apparent aerodynamic shape of the surface which alters the streamwise pressure gradient upstream of separation. In this approach, actuation is affected by forming a controlled interaction domain of trapped vorticity between a surface-mounted fluidic actuator and the cross flow over the aerodynamic surface. Under this approach control is achieved using actuation having frequencies that are at least an order-of-magnitude greater than the characteristic wake frequency and are therefore decoupled from global flow instabilities. Thus, flow control is advantageously affected not only when the baseline flow is separated, but also when significant portions of the flow are attached, such as during cruise conditions at low angles of attack. However active flow control provided by fluidic oscillators has varying levels of efficiency and effectiveness, with some fluidic oscillators having a relatively large footprint.

With respect to aircraft, some aircraft, such as some transport aircraft, employ high-lift systems that influence the design and performance of the aircraft. In this regard, performance characteristics, such as maximum take-off weight, required runway length and stall speeds, are impacted by the high-lift systems. Historically, high-lift systems have included complex, multi-element designs with intricate positioning mechanisms to improve performance and efficiency. Although high-lift systems have been simplified, high-lift systems may be further improved in terms of weight, number of parts, fabrication costs and/or cruise efficiency. Thus, active flow control has been considered as an option to improve high-lift performance. In this regard, active flow control may enable increased levels of performance, such as an increased coefficient of lift $C_L$, with reduced complexity. However, the manner of implementing active flow control in an efficient and effective manner for high-lift systems has yet to be resolved.

BRIEF SUMMARY

An aerodynamic surface assembly is provided in accordance with an example embodiment in order to facilitate control of the flow over the aerodynamic surface. By controlling the flow over the aerodynamic surface, such as by utilizing active flow control, flow separation from the aerodynamic surface may be mitigated. In addition, the aerodynamic surface assembly may provide for flow control in a manner that facilitates other improved performance characteristics, such as an increased coefficient of lift.

In an example embodiment, an aerodynamic surface assembly is provided that includes an aerodynamic surface defining an outer mold line over which a fluid is to flow in a downstream direction. The outer mold line defines a smooth contour that is interrupted by step down region that is inset relative to the smooth contour defined by the outer mold line upstream thereof. The aerodynamic surface defines an orifice opening in to the step down region. The aerodynamic surface assembly of this example embodiment also includes an overhang extending from the outer mold line of the aerodynamic surface upstream at the orifice. The overhang extends in the downstream direction and at least partially over the orifice.

The orifice of an example embodiment extends in a direction having a directional component in the downstream direction. In one embodiment, the orifice defines a throat having a curved shape that defines a flow direction that increasingly extends in the downstream direction as the throat transitions from within the aerodynamic surface towards an exit of the orifice. The overhang of this embodiment defines a portion of the throat of the orifice including the curved shape of the orifice.

The step down region of an example embodiment smoothly transitions to the smooth contour of the outer mold line downstream of the orifice. The overhang of an example embodiment extends over the orifice such that the orifice is not visible when viewed in a direction perpendicular to the outer mold line at the step down region. In an example embodiment, the aerodynamic surface defines a plurality of orifices disposed in a linear array. The aerodynamic surface assembly of this example embodiment includes a plurality of overhangs with each overhang extending at least partially over a respective orifice. The plurality of orifices of this example embodiment may be disposed in first and second linear arrays with the second linear array being downstream at the first linear array. The orifices of the second linear array may be laterally offset relative to the orifices of the first linear array.

The aerodynamic surface assembly of an example embodiment also includes a fluidic actuator defining a pair of curved passageways that extend from an input region to an interaction cavity that is in fluid communication with the orifice. The curved passageways of the fluidic actuator may have a horseshoe geometry. The aerodynamic surface assembly of this example embodiment may also include a plenum defined so as to extend through the aerodynamic surface. The input region of the fluidic actuator of this example embodiment is in fluid communication with the plenum so as to receive fluid from the plenum that is then directed through the orifice.

In another example embodiment, an aerodynamic surface assembly is provided that includes an aerodynamic surface defining an outer mold line through which a fluid is to flow in a downstream direction. The outer mold line defines a smooth contour interrupted by a step down region that is inset relative to the smooth contour defined by the outer mold line upstream thereof. The aerodynamic surface defines an orifice opening into the step down region. The aerodynamic surface assembly also includes a fluidic actuator defining a pair of curved passageways that extend from an input region and that are in fluid communication with the orifice so as to permit fluid to pass through the curved passageways and to exit through the orifice.

The fluidic actuator of an example embodiment further defines an interaction cavity upstream of the orifice. The interaction cavity is configured to receive fluid from the pair of curved passageways and to be in fluid communication with the orifice. The curved passageways of the fluidic actuator may have a horseshoe geometry. The aerodynamic surface assembly of an example embodiment also includes a plenum defined so as to extend through the aerodynamic surface. The input region of the fluidic actuator is in fluid communication with the plenum so as to receive fluid from the plenum that is then directed through the orifice.

The orifice of an example embodiment extends in a direction having a directional component in a downstream direction. In an example embodiment, the orifice defines a throat having a curved shape that defines a flow direction that increasingly extends in a downstream direction as the throat transitions from within the aerodynamic surface toward an exit of the orifice. The aerodynamic surface of an example embodiment also includes an overhang extending from the outer mold line of the aerodynamic surface upstream of the orifice. The overhang extends in the downstream direction at least partially over the orifice. The overhand defines a portion of the throat of the orifice including the curved shape of the orifice. The overhang of an example embodiment extends over the orifice such that the orifice is not visible when viewed in a direction perpendicular to the outer mold line at the step down region. The step down region of an example embodiment smoothly transitions to the smooth contour of the outer mold line downstream of the opening.

BRIEF DESCRIPTION OF THE DRAWINGS

Figure 1:
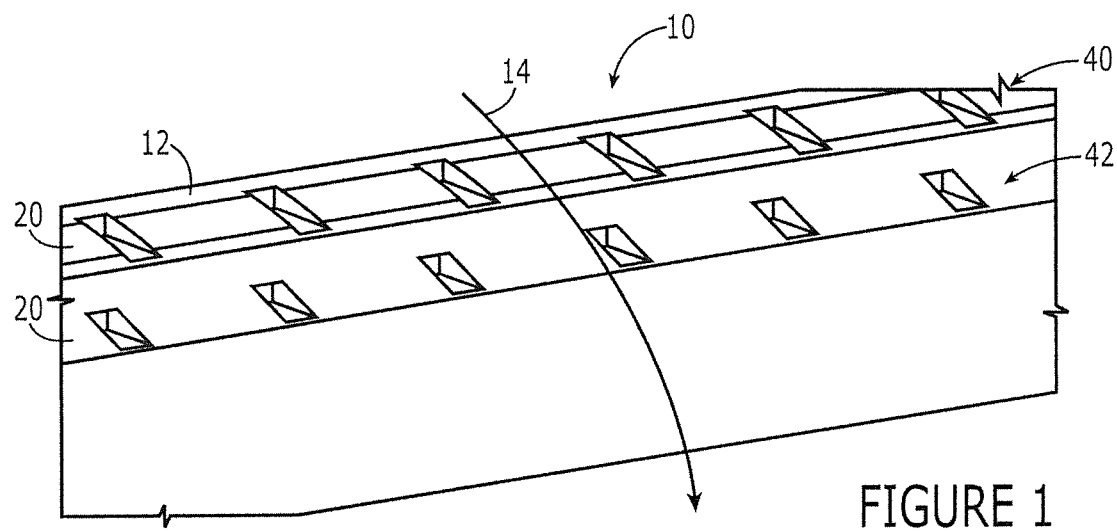
Figure 2:
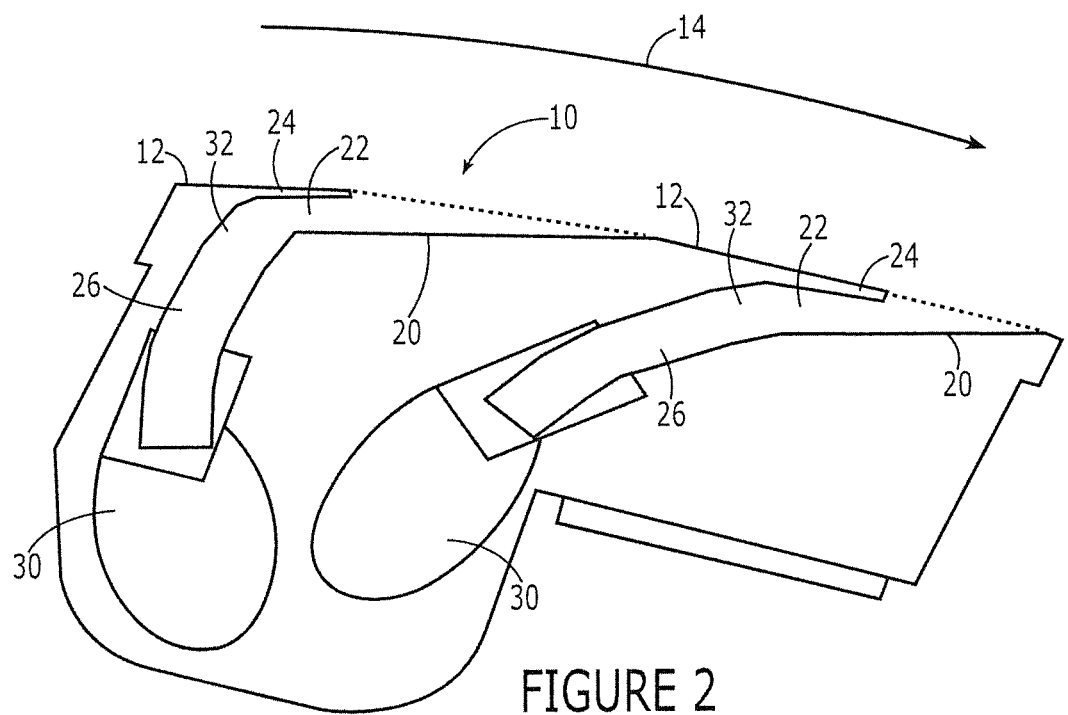
Figure 3:
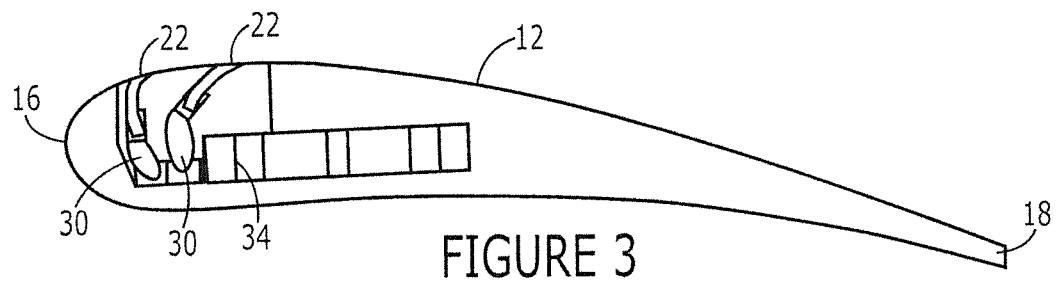
Figure 4:
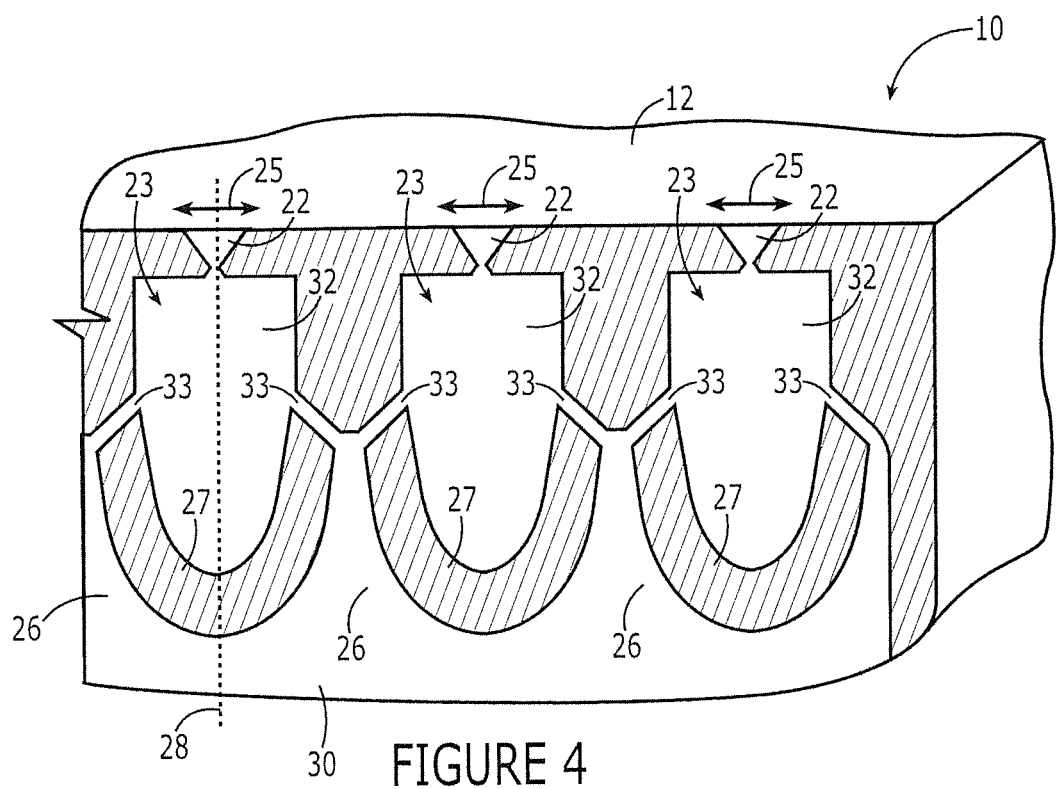

Having thus described certain example embodiments of the present disclosure in general terms, reference will hereinafter be made to the accompanying drawings, which are not necessarily drawn to scale, and wherein:

FIG. 1 is a perspective view of an aerodynamic surface assembly that includes a plurality of orifices configured to provide active flow control in accordance with an example embodiment of the present disclosure;

FIG. 2 is a cross-sectional side view of a portion of the aerodynamic surface assembly of FIG. 1 taken along line 2-2 in accordance with an example embodiment of the present disclosure;

FIG. 3 is a cross-sectional side view of the aerodynamic surface of FIG. 1 taken along line 2-2 in which the portion of the aerodynamic surface of assembly depicted in FIG. 2 is placed in context with respect to the remainder of the aerodynamic surface in accordance with an example embodiment of the present disclosure;

FIG. 4 is a plan view depicting the structure of a fluidic actuator disposed within an aerodynamic surface in accordance with an example embodiment of the present disclosure; and FIG. 5 is a side view of an aerodynamic surface having a trailing edge flap and a drooped leading edge in which the orifice is positioned at a bend of the aerodynamic surface in accordance with an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

Referring now to FIG. 1, one example of an aerodynamic surface 10 that may be configured in accordance with an example embodiment of the present disclosure is depicted. The aerodynamic surface 10 may be a wing or other control surface of an aircraft, such as represented by the portion depicted in FIG. 1. However, the aerodynamic surface 10 may be utilized in a wide variety of other applications including aerodynamic surfaces of other types of vehicles as well as other types of structures. For purposes of example, but not of limitation, an aerodynamic surface 10 that serves as a wing or other control surface of an aircraft will be described hereinafter with a more particular example being provided of an aerodynamic surface of an aircraft configured to implement a high-lift system so as to have improved performance characteristics, such as maximum take-off weight, required runway length and stall speeds.

The aerodynamic surface 10 includes an outer mold line 12 over which a fluid is to flow in a downstream direction 14, such as from the leading edge 16 of the aerodynamic surface to the trailing edge 18 of the aerodynamic surface as established by the direction of movement of the aerodynamic surface through the flow field. The outer mold line 12 defines a smooth contour that is interrupted by a step down region 20 as shown in FIG. 1 and also in FIGS. 2 and 3. The smooth contour defined by the outer mold line 12 establishes a smoothly curved surface without any sharp edges, at least in the vicinity of the step down region 20, such as that region proximate the step down region on both the upstream and downstream sides of the step down region. The step down region 20 is inset relative to the smooth contour defined by the outer mold line 12 upstream of the step down region, such as by 0.8 mm in one example embodiment. In this regard, the smooth contour defined by those portions of the outer mold line 12 immediately upstream and downstream of the step down region 20 would be positioned exterior of the step down region as shown by the dashed continuation of the outer mold line of FIG. 2. In other words, the step down region 20 is positioned interior of the smooth contour otherwise defined by the outer mold line 12 at the location of the step down region.

As shown in FIGS. 1-3, the aerodynamic surface 10 also defines an orifice 22 opening into the step down region 20. In the embodiment depicted in FIG. 1, for example, the aerodynamic surface 10 includes first and second linear arrays 40, 42 of orifices, as described below in more detail. The orifice 22 extends from within the interior of the aerodynamic surface 10 to an exit within the step down region 20. The orifice 22 of the illustrated embodiment extends in a direction having a directional component in the downstream direction 14. In this regard, the orifice extends at an angle so as to extend in a direction having directional components both in a direction perpendicular to that portion of the aerodynamic surface immediately upstream of the step down region 20 and in the downstream direction 14. As such, the orifice is angled in the downstream direction. The orifice may be angled so as to define various orientation angles, with the orifice of one example embodiment being defined to have an angle of 45° relative to the downstream direction 14.

The orifice 22 of an example embodiment defines a throat having a curved shape, including both smoothly curved and beveled shapes, that defines a flow direction that increasingly extends in the downstream direction 14 as the throat transitions from within the aerodynamic surface toward the exit of the orifice. Thus, at a location near the entrance to the orifice 22 within the aerodynamic surface 10, the flow direction defined by the centerline of the throat may be at approximately 45° with respect to the downstream direction 14. However, at locations closer to the exit of the orifice 22, the flow direction defined by the centerline of the throat has a progressively larger directional component in the downstream direction 14 and a progressively smaller directional component in the direction perpendicular to the downstream direction such that upon exit from the orifice, the flow direction is either parallel to the aerodynamic surface 10 immediately downstream of the step down region 20 or has only a very small angle, such as 10° or 5° or less, relative to the aerodynamic surface immediately downstream of the step down region.

By controllably directing fluid through the orifice 22 and into the flow field immediately downstream of the step down region 20, the flow field may be altered in a controlled fashion, such as by mitigating the partial or complete separation of the flow from the aerodynamic surface 10 downstream of the step down region. In order to facilitate the transition of the fluid from the exit of the orifice 22, the step down region 20 of an example embodiment smoothly transitions to the smooth contour of the outer mold line 12 downstream of the orifice, such as by defining a smooth curve there between. In an example embodiment, the step down region 20 defines a linear surface downstream of the orifice 22 that smoothly transitions to the smooth contour of the outer mold line 12 downstream of the orifice.

As also shown in FIG. 2, the aerodynamic surface assembly of an example embodiment includes an overhang 24. The overhang 24 extends from the outer mold line 12 of the aerodynamic surface 10 upstream of the orifice 22. The overhang 24 extends in the downstream direction 14 so as to extend at least partially over the orifice 22. As illustrated, the outer surface of the overhang 24 may follow and continue the smooth contour defined by the outer mold line 12 of the aerodynamic surface 10 so as to effectively serve as a continuation of the outer mold line at least partially over the orifice 22 that opens through the step down region 20. Although the downstream end of the overhang 24 may be a sharp edge, the downstream end of the overhang of an example embodiment is formed by a flat surface, such as a flat surface having a height of 0.25 mm, to facilitate improved dimensional accuracy during the fabrication process. Internally, the overhang 24 of an example embodiment defines a portion of the throat of the orifice 22 including the curved shape of the orifice. In this regard, the internal surface of the overhang 24 may smoothly transition, such as by defining a smoothly curved or a beveled interior surface, from the angle at which the orifice 22 extends from within the aerodynamic surface 10 to an angle that increasingly extends in the downstream direction 14 as the throat approaches the exit of the orifice. Although the beveled interior surface of the overhang 24 may define various angles with respect to the outer mold line 12 proximate the step down region 20, the beveled interior surface of the overhang of certain example embodiments may define an angle of 26°, 37° or 45°.

The overhang 24 may extend partially over the orifice 22 that opens through the step down region 20. However, the overhang 24 of an example embodiment extends over the orifice 22 such that the orifice is not visible when viewed in a direction perpendicular to the outer mold line 12 at the step down region 20. Instead, the smooth transition of the flow direction defined by the throat of the orifice 22 causes the exit of the orifice to face the downstream direction 14 and either not be visible or be only partially visible when viewed in a direction perpendicular to the outer mold line 12 as a result of the extension of the overhang over the orifice.

As shown in FIG. 4 in which the interior of the aerodynamic surface 10 is depicted, the aerodynamic surface assembly of an example embodiment also includes one or more fluidic actuators 23 (three of which are shown in FIG. 4). The fluidic actuator 23 provides for the flow of fluid through the orifice 22 and into the flow field that passes over the aerodynamic surface 10 (such as in a direction generally into the page in FIG. 4). As described below, the fluidic actuator 23 of an example embodiment is configured to provide for self-oscillation of the fluid such that the fluid that exits the orifice 22 oscillates laterally, back and forth in a spanwise direction across the width of the exit of the orifice, such as shown by double headed arrows 25 in FIG. 4. The self-oscillation of the fluid provides the technical advantage of improving the aerodynamic performance by further facilitating the controlled engagement of the fluid exiting the orifice with the fluid field. The fluidic actuator 23 may cause the fluid to oscillate in the spanwise direction 25 at various frequencies, such as at a frequency of 6 KHz in one example embodiment. As a result of the oscillation frequency of the actuator being sufficient high, fluctuations induced by the fluidic actuator 23 in the fluid field are decoupled from the near wake instability of the aerodynamic surface 10. In an example embodiment, the oscillation frequency of the actuator 23 is at least 10 times greater than the characteristic frequency of the flow structure that is to be controlled which, in turn, may be determined by a characteristic length and speed, for example, the chord of an airfoil and the freestream airspeed.

The fluidic actuator 23 of an example embodiment depicted in FIG. 4 defines a pair of curved passageways 26. The curved passageways 26 may be defined, at least in part, by an arcuate, e.g., curved, diverter or blockage 27 that forces the fluid entering the passageways to follow a curved path about the diverter or blockage. Each passageway 26 may be identically sized and shaped relative to the other passageways and each passageway may be bowed or curved by an equal amount relative to a centerline 28 extending between the passageways, one of which is depicted in FIG. 4. The bowing or curvature of the passageways 26 extends in opposite directions from the centerline 28 as shown in FIG. 4. As such, the curved passageways 26 of the fluidic actuator 23 define a horseshoe geometry with the pair of passageways defining a U-shape opening toward the outer mold line of the aerodynamic surface 10. Although a pair of curved passageways 26 are depicted in the illustrated embodiment and are described herein, the fluidic actuator 23 may include additional curved passageways in other example embodiments.

The curved passageways 26 extend from an input region 30 to an interaction cavity 32. The input region 30 is in fluid communication with both passageways 26, such as at the end of the passageways at which the passageways join to define the U-shape. The interaction cavity 32 is in fluid communication with the orifice 22, such as by being immediately upstream of the orifice in terms of the direction in which the fluid flows through the curved passageways 26. Like the passageways 26 and the diverter or blockage 27, the interaction cavity 32 is also curved. As such, the fluidic actuator 23, including the passageways 26, the diverter or blockage 27 and the interaction cavity 32, are curved in an example embodiment.

Fluid enters the curved passageways 26 via the input region 30. In an example embodiment, the aerodynamic surface assembly includes a plenum 34, such as a plenum defined within and extending through the aerodynamic surface 10 as shown in FIG. 3 in which the fluidic actuator of FIG. 2 is placed in the context of the aerodynamic surface. In this example embodiment, the input region 30 of the fluidic actuator is in fluid communication with the plenum 34 so as to receive fluid from the plenum that is then directed through the orifice 22. As such, fluid may be directed through the plenum 34 and, in turn, into the input region 30 of the fluidic actuator. The fluid received by the input region 30 of the fluidic actuator is divided and flows through the pair of curved passageways 26 prior to combining within the interaction cavity 32 and then passing through the throat of the orifice 22 prior to being ejected via the exit of the orifice so as to interact with the flow field downstream of the step down region 20.

The fluid enters the interaction cavity 32 from the curved passageways 26 via respective angled inlets 33. Each passageway of a pair of curved passageways 26 is in communication with a respective angled inlet 33. Each angled inlet 33 introduces fluid into the interaction cavity 32 with directional components extending upwardly (in the orientation of FIG. 4) toward the orifice 22 and inwardly toward the centerline 28. As a result of the recombination of the fluid that flowed through the pair of curved passageways 26 within the interaction cavity 32 including the recombination of the fluid having directional components that extend inwardly from the angled inlets 33 toward the centerline 28 from opposite directions, the fluid that passes through the orifice 22 and exits therefrom oscillates, such as in a lateral direction perpendicular to the direction of flow of the fluid. This oscillation of the fluid that exits the orifice 22 and interacts with the flow field provides for enhanced control of the flow field and improvements in regards to performance characteristics associated with high-lift systems, such as an improved coefficient of lift $C_L$. In this regard, the fluid that exits the orifice 22 results in increased flow attachment extent along the aerodynamic surface 10 and, thus, increased suction, leading to increased lift.

The step down region 20 and, consequently, the orifice 22 may be located at various positions across the outer mold line 12 of the aerodynamic surface 10. One example of the location of the orifice relative to an aerodynamic surface 10 is in the context of an aerodynamic surface that includes a bend in which the aerodynamic surface has a sharper change in direction then other portions of the same aerodynamic surface. In this regard, FIG. 5 depicts an example of an aerodynamic surface 10 in the form of an aircraft control surface 50 having a drooped leading edge 52 and a trailing edge flap 54 with the bend 56 being defined between the trailing edge flap and the portion of the aircraft control surface upstream of the trailing edge flap with a deflection angle there between of 20° to 40°, for example. In an example embodiment, the step down region 20 and the orifice 22 that opens through the step down region are located coincident to the bend defined by the aircraft control surface 50. With respect to the aircraft control surface 50 of FIG. 5 having a drooped leading edge 52 and a trailing edge flap 54, the step down region 20 and the orifice 22 opening therethrough may be located at the bend 56 at which the trailing edge flap is joined to the remainder of the aircraft control surface upstream of the trailing edge flap. The fluid exiting the orifice 22 at the bend 66 may define an inclination angle, such as an inclination angle of between 26° and 37° with respect to the local surface tangent.

The location of the orifice 22 at the bend 56 of an aerodynamic surface 10 provides technical advantages in that the flow exiting the orifice and mixing with the flow field proximate the aerodynamic surface creates a suction peak near the bend and controllably alters the flow field and advantageously impacts the performance of the aerodynamic surface. More particularly, the flow exiting the orifice 22 creates vorticity concentrations near the bend 56 which leads to the formation of a strong low pressure domain that causes a Coanda-like effect in which the flow is deflected along the surface of the trailing edge flap 54, thereby leading to increased flow attachment extent and an increase in lift. This effect is most pronounced with the orifice 22 located immediately upstream of the separation point because an orifice located downstream of the separation point is less effective at improving performance. The flow exiting the orifice 22 therefore provides for increased suction along the surface of the aircraft control surface 50 and also increases the suction along the trailing edge flap 54, thereby resulting in a higher coefficient of lift $C_L$. The increase in the coefficient of lift is accompanied by an increase in pressure drag due to the added lift-induced drag, along with an additional downward pitching moment.

In an example embodiment, the aerodynamic surface 10 defines a plurality of orifices 22. In an example embodiment, the plurality of orifices 22 are disposed in a linear array, such as a linear array extending perpendicularly, such as laterally, relative to the downstream direction 14 defined by the fluid flow over the aerodynamic surface, as shown in FIG. 1. The aerodynamic surface assembly of this example embodiment also includes a plurality of overhangs 24. Each overhang 24 extends at least partially over a respective orifice 22, such as described above with respect to a single orifice and its corresponding overhang. Further, each orifice 22 may be fed by fluid provided by a respective fluidic actuator, such as described above with respect to the embodiment of FIG. 4, such that the fluid exiting the orifice controllably mixes with the flow field downstream of the orifice. Since the aerodynamic surface 10 of this example embodiment includes a plurality of orifices 22, such as a plurality of linearly arrayed orifices, the resulting impact upon the flow field is the aggregate effect of the fluid exiting from the plurality of orifices with the flow field, thereby providing for a greater impact upon and more control over the flow field and the corresponding performance permitted by the aerodynamic surface.

The orifices 22 defined by the aerodynamic surface 10 of some example embodiments are arranged in a plurality of linear arrays, such as two, three or more linear arrays. For example, the plurality of orifices 22 may be disposed in first and second linear arrays 40, 42, such as shown in FIG. 1. The linear arrays may be differently configured, but, in one example embodiment, each linear array has 70 orifices with each orifice separated from the neighboring orifices by 7 mm. The second linear array 42 is downstream of the first linear array 40. In addition, the orifices 22 of the second linear array 42 are laterally offset, e.g., staggered, relative to the orifices of the first linear array 40, such as shown in FIG. 1, in order to mitigate mutual interference between the linear arrays. For example, the orifices 22 of the second linear array 42 may each be positioned at a midpoint between a pair of orifices of the first linear array 40. By including a plurality of orifices 22 and arranging those orifices in a linear array, such as first and second staggered linear arrays 40, 42, the fluid that exits the respective orifices interacts Hproviding increased control of the flow field downstream of the orifices and greater performance improvements including performance improvements related to the coefficient of lift $C_L$. Other than being differently positioned, each of the orifices and the respective overhang of the linear array(s) may be structured in an identical fashion, such as that described above.

The aerodynamic surface assembly of the example embodiments described above provides for improved aerodynamic performance by facilitate control of the flow over the aerodynamic surface 10. By controlling the flow over the aerodynamic surface 10, such as by utilizing active flow control, partial or complete flow separation from the aerodynamic surface may be mitigated, thereby improving the aerodynamic performance.A As also described above, the aerodynamic surface assembly of an example embodiment provides for flow control in a manner that facilitates other improved performance characteristics, such as an increased coefficient of lift.

Many modifications and other aspects of the disclosure set forth herein will come to mind to one skilled in the art to which this disclosure pertains having the benefit of the teachings presented in the foregoing descriptions and the associated drawings. For example, the fluidic actuators 23 are described and illustrated in the foregoing example embodiments as being integrated at one location along the aerodynamic surface 10. However, the fluidic actuators 23 may, instead, be integrated at multiple locations and/or at a different location along the aerodynamic surface 10 in accordance with other example embodiments of the present disclosure. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An aerodynamic surface assembly comprising:
    an aerodynamic surface defining an outer mold line over which a fluid is to flow in a downstream direction, wherein the outer mold line defines a smooth contour interrupted by first and second step down regions that are inset relative to the smooth contour defined by the outer mold line upstream thereof, wherein the aerodynamic surface defines first and second arrays of orifices opening into the first and second step down regions, respectively, wherein the second linear array is downstream of the first linear array, and wherein the orifices of the second linear array are laterally offset relative to the orifices of the first linear array; and
    first and second overhangs extending from the outer mold line of the aerodynamic surface upstream of the first and second arrays of orifices, respectively, wherein the first and second overhangs extend in the downstream direction at least partially over the first and second arrays of orifices, respectively, and at least over at least a portion of the first and second step down regions, respectively,
    wherein an inwardly facing surface of the second overhang that faces the respective step down region defines a smaller angle with respect to the outer mold line upstream of the respective array of orifices than an angle defined between the respective step down region and the outer mold line upstream of the respective array of orifices.

2. An aerodynamic surface assembly of claim 1 wherein each orifice extends in a direction having a directional component in the downstream direction.

3. An aerodynamic surface assembly of claim 1 wherein each orifice defines a throat having a curved shape that defines a flow direction that increasingly extends in the downstream direction as the throat transitions from within the aerodynamic surface toward an exit of the orifice.

4. An aerodynamic surface assembly of claim 3 wherein each overhang defines a portion of the throat of the orifices of the respective array including the curved shape of the orifices.

5. An aerodynamic surface assembly of claim 1 wherein each step down region smoothly transitions to the smooth contour of the outer mold line downstream of the respective array of orifices.

6. An aerodynamic surface assembly of claim 1 wherein each overhang extends over the respective array of orifices such that the orifices are not visible when viewed in a direction perpendicular to the outer mold line at the respective step down region.

7. An aerodynamic surface assembly according to claim 1 further comprising a fluidic actuator defining a pair of curved passageways that extend from an input region to an interaction cavity in fluid communication with the orifices.

8. An aerodynamic surface assembly according to claim 7 wherein the curved passageways of the fluidic actuator have a horseshoe geometry.

9. An aerodynamic surface assembly according to claim 7 further comprising a plenum defined so as to extend through the aerodynamic surface, wherein the input region of the fluidic actuator is in fluid communication with the plenum so as to receive fluid from the plenum that is then directed through the orifices.

10. An aerodynamic surface assembly comprising:
    an aerodynamic surface defining an outer mold line over which a fluid is to flow in a downstream direction, wherein the outer mold line defines a smooth contour interrupted by first and second step down regions that are inset relative to the smooth contour defined by the outer mold line upstream thereof, wherein the aerodynamic surface defines first and second arrays of orifices opening into the first and second step down regions, respectively, wherein the second linear array is downstream of the first linear array, and wherein the orifices of the second linear array are laterally offset relative to the orifices of the first linear array; and a fluidic actuator defining an interaction cavity upstream of the first array of orifices and a pair of curved passageways that extend from an input region and are in fluid communication with the first array of orifices so as to permit fluid to pass through the curved passageways and to exit through the first array of orifices, wherein an orifice of the first array of orifices diverges from a first end adjacent the interaction cavity to a second end proximate the outer mold line such that the second end of the orifice is wider than the first end of the orifice, and wherein the pair of curved passageways are configured to provide fluid to the interaction cavity such that fluid that enters the interaction cavity has passed through at least one of the curved passageways.

11. An aerodynamic surface assembly according to claim 10 wherein the curved passageways of the fluidic actuator have a horseshoe geometry.

12. An aerodynamic surface assembly according to claim 10 further comprising a plenum defined so as to extend through the aerodynamic surface, and wherein the input region of the fluidic actuator is in fluid communication with the plenum so as to receive fluid from the plenum that is then directed through the curved passages and the interaction cavity to the orifice.

13. An aerodynamic surface assembly of claim 10 wherein the orifice extends in a direction having a directional component in the downstream direction.

14. An aerodynamic surface assembly of claim 10 wherein the orifice defines a throat having a curved shape that defines a flow direction that increasingly extends in the downstream direction as the throat transitions from within the aerodynamic surface toward an exit of the orifice.

15. An aerodynamic surface assembly of claim 14 further comprising an overhang extending from the outer mold line of the aerodynamic surface upstream of the orifice, wherein the overhang extends in the downstream direction at least partially over the orifice, and wherein the overhang defines a portion of the throat of the orifice including the curved shape of the orifice.

16. An aerodynamic surface assembly of claim 15 wherein the overhang extends over the orifice such that the orifice is not visible when viewed in a direction perpendicular to the outer mold line at the step down region.

17. A method of enhancing aerodynamic performance, the method comprising:

establishing a flow field over an outer mold line of an aerodynamic surface in a downstream direction, wherein the outer mold line defines a smooth contour interrupted by first and second step down regions that are inset relative to the smooth contour defined by the outer mold line upstream thereof, wherein the aerodynamic surface defines first and second arrays of orifices opening into the step down regions, respectively, wherein the second linear array is downstream of the first linear array, and wherein the orifices of the second linear array are laterally offset relative to the orifices of the first linear array; and ejecting fluid through the first and second set of orifices and into the flow field, wherein ejecting fluid through the orifices comprises receiving the fluid from a plenum that extends through the aerodynamic surface into an input region, directing the fluid from the input region into a pair of curved passageways of a fluidic actuator, wherein the curved passageways are in fluid communication with an interaction cavity upstream of the orifices such that the fluid that passes through the curved passageways enters the interaction cavity and exits through the orifices such that fluid that enters the interaction cavity has passed through at least one of the curved passageways, wherein an orifice of the first array of orifices diverges from a first end adjacent the interaction cavity to a second end proximate the outer mold line such that the second end of the orifice is wider than the first end of the orifice such that fluid is ejected through the wider second end and into the flow field.

* * * * *